United States Patent [19]
Mecozzi

[11] Patent Number: 6,023,899
[45] Date of Patent: Feb. 15, 2000

[54] WALL PANEL ASSEMBLY WITH AIRTIGHT JOINT

[75] Inventor: Walter P. Mecozzi, Edmond, Okla.

[73] Assignee: ClimateCraft Technologies, Inc., Oklahoma City, Okla.

[21] Appl. No.: 09/185,766

[22] Filed: Nov. 3, 1998

[51] Int. Cl.$^7$ ................................................. E04B 1/684
[52] U.S. Cl. ................... 52/396.04; 52/396.1; 52/582.1; 52/792.1; 52/794.1; 403/337; 403/338; 403/288
[58] Field of Search ................................ 52/792.1, 794.1, 52/795.1, 802.1, 742.11, 582.1, 578, 520, 542, 396.1, 396.01, 396.04, 396.09, 394, 393; 403/337, 288, 335, 338

[56] References Cited

U.S. PATENT DOCUMENTS

| | | | |
|---|---|---|---|
| 1,780,269 | 11/1930 | Miller | 52/578 |
| 2,021,868 | 11/1935 | Patterson | 52/394 |
| 2,634,017 | 4/1953 | Moyer | 52/394 X |
| 3,670,466 | 6/1972 | Lynch | 52/794.1 X |
| 4,075,811 | 2/1978 | Keith | 52/395 |
| 4,320,611 | 3/1982 | Freeman | 52/396.04 X |

FOREIGN PATENT DOCUMENTS

| | | | |
|---|---|---|---|
| 584649 | 10/1959 | Canada | 52/394 |
| 692426 | 8/1964 | Canada | 403/337 |
| 929982 | 6/1963 | United Kingdom | 52/394 |

*Primary Examiner*—Laura A. Callo
*Attorney, Agent, or Firm*—Mary M. Lee

[57] ABSTRACT

A wall panel assembly with a sealed joint. The sealed joint is virtually airtight even in an enclosure having an ambient air pressure substantially greater than the air pressure outside the enclosure, such as an air handling cabinet. Each joint is comprised of two abutting looped joint edges in combination with a Y-shaped seal. The looped joint edge provides added structural rigidity to the panels, and the enlarged looped ends on the joint edges enclose and protect the seal therebetween from exposure to the elements. The seal itself not only withstands positive internal air pressure but is actually improved thereby. Abutting joint edges of adjacent wall panels create a narrow channel for receiving the longitudinal flange portion of the seal, and a broader V-shaped channel to receive the enlarged body portion of the seal. In this way, the body portion of the seal is seated in a channel so that internal pressure exerted against the seal will cause the seal to appressingly engage the channel. Thus, increased internal air pressure improves the sealed joint rather than compromising it. The seal can be provided with a longitudinal slit for receiving the edge of internal divider panels. Adjacent wall panels are joined by fasteners intersecting the outwardly extending looped portions of the joint edges. In this way, the fasteners are accessible from the outside, and the integrity of the seal is preserved.

9 Claims, 2 Drawing Sheets

2

WALL PANEL ASSEMBLY WITH AIRTIGHT JOINT

FIELD OF THE INVENTION

The present invention relates generally to sealed joints for panels and more particularly to wall panel assemblies with airtight joints.

BACKGROUND OF THE INVENTION

Air handling equipment typically is housed in an enclosure referred to as an air handling cabinet which is formed of a plurality of air handler panels joined at vertical seams by sealed joints. Various types of sealed joint configurations are known. However, there is a need for an improved joint which will provide an airtight connection, protect against degradation of the elastomeric material forming the seal member, facilitate the use of liner panels, and be relatively simple to assemble.

SUMMARY OF THE INVENTION

The present invention is directed to a wall panel assembly comprising first and second wall panels, each having an interior side and exterior side and each having at least one joint edge. Each joint includes a seal being generally Y-shaped in cross-section, having a longitudinal flange extending from a broader body portion with an outer diameter which gradually decreases to meet the base of the flange. Means is provided for connecting the joint edges. Each joint edge of the first and second panels is folded back upon itself to form a looped portion on the exterior side of the panels extending a distance outwardly from the exterior side and a leg portion on the interior side of the panels extending a distance inwardly from the interior side. The looped portion is formed to provide a seal flange receiving space, and the leg portion is formed to provide a seal body receiving portion. Thus, when the joint edges of the first and second panel are positioned adjacent each other, the adjacent flange receiving spaces form a seal flange channel and the adjacent body receiving spaces form a seal body channel. The seal body channel is generally V-shaped diverging toward the interior sides of the panels. In this way, when the seal is positioned between immediately adjacent joint edges, the flange is positioned in the flange channel and the body portion is positioned in the body channel. As a result, positive pressure on the interior side of the panels will urge the body portion of the seal into appressing engagement with the seal body channel.

Further, the present invention includes a wall panel for use in forming an enclosure with other similar wall panels and Y-shaped seals, which seals have a flange portion and a broader body portion. The wall panel has an exterior side and interior side and a joint edge. The joint edge is folded back upon itself to form a looped portion on the exterior side of the panel extending a distance outwardly from the exterior side and a leg portion on the interior side of the panel extending a distance inwardly from the interior side. The looped portion is formed to provide a seal flange receiving space, and the leg portion is formed to provide a seal body receiving portion. Thus, when the joint edge of the wall panel is positioned adjacent the joint edge of a similar wall panel, the adjacent seal flange receiving spaces form a seal flange channel and the adjacent seal body receiving spaces form a seal body channel. The seal body channel thus formed is generally V-shaped diverging toward the interior sides of the panels, so that when a Y-shaped seal is positioned between immediately adjacent joint edges, the flange is positioned in the flange channel and the body portion is positioned in the base channel. In this way, positive pressure on the interior side of the panels will urge the body portion of the seal into appressing engagement with the seal body channel.

Still further, the present invention is directed to a seal for use in sealing the joint formed by adjoining joint edges of two wall panels. The seal is generally Y-shaped in cross-section, and has a longitudinal flange extending from a broader body portion having an outer diameter which gradually decreases to meet the base of the flange.

DETAILED DESCRIPTION OF THE PREFERRED EMBODIMENT

Figure 1:
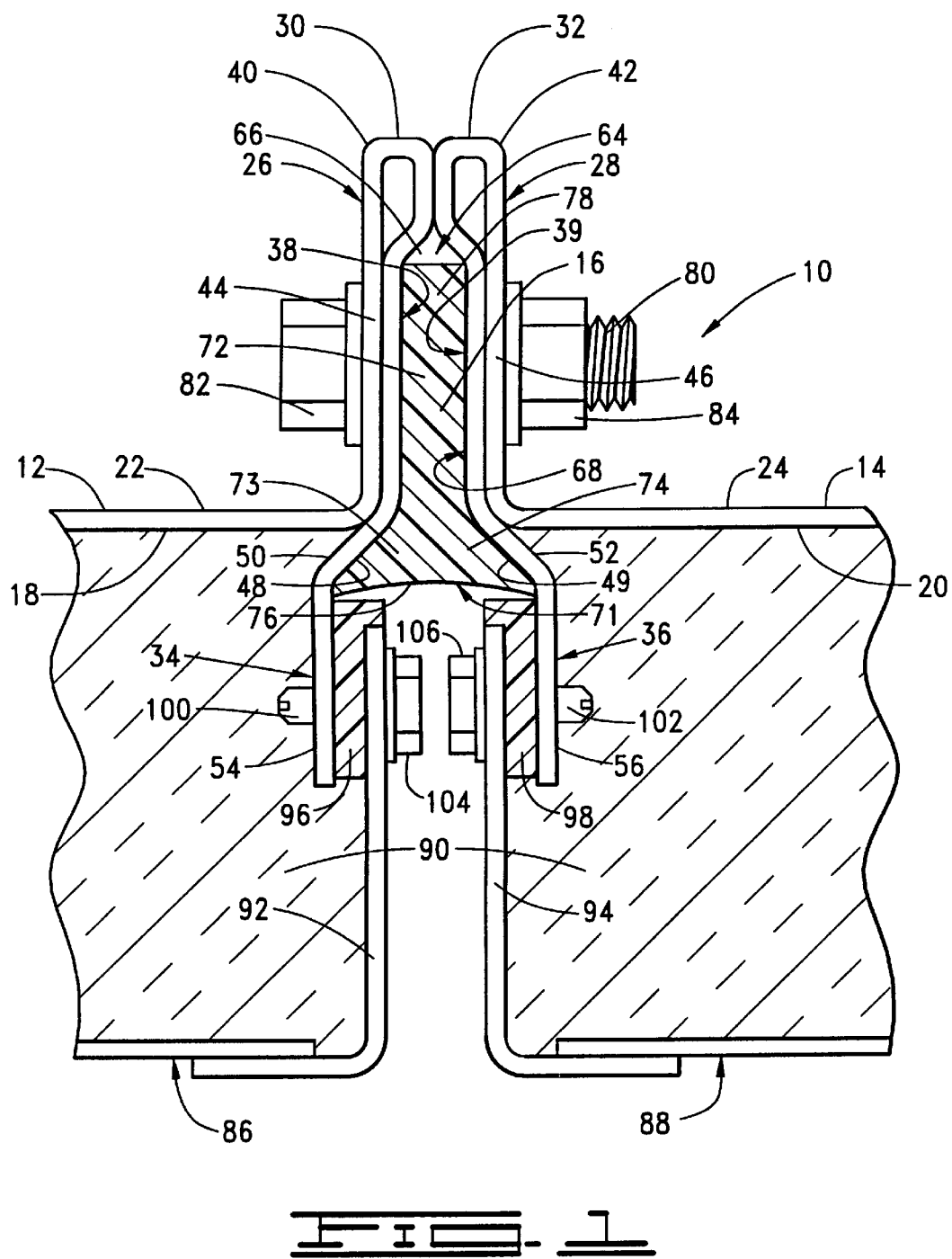
FIG. 1 shows a fragmented, exploded plan view of a panel assembly constructed in accordance with the present invention.

With reference now to the drawings in general and to FIG. 1 in particular, there is shown therein a jointed wall panel assembly constructed in accordance with a first embodiment of the present invention and designated by the reference numeral 10. The panel assembly 10 generally comprises a first wall panel 12, a second wall panel 14 and a seal 16.

Each of the wall panels 12 and 14 has an interior side 18 and 20 and an exterior side 22 and 24. The interior side corresponds to the inside of the structure or enclosure formed by the jointed panel assembly 10, and the exterior side corresponds to the exterior of such structure or enclosure.

Each of the wall panels 12 and 14 has at least one joint edge 26 and 28. The joint edges 26 and 28 are configured to abut each other and capture the seal 16 therebetween in a manner described in more detail hereafter. It will be appreciated that the drawings herein illustrate only one sealed joint, but that a structure or enclosure, such as an air handling enclosure, may comprise many such panels and joints. Accordingly, panels may be formed with two joint edges, each the mirror image of the other.

Referring still to FIG. 1, each joint edge 26 and 28 is folded back upon itself to form a looped portion 30 and 32 and a leg portion 34 and 36. Each of the looped portions 30 and 32 is formed to provide a seal flange receiving space 38 and 39. For example, the looped portions 30 and 32 may be bent outwardly, preferably perpendicular to the plane of the wall panels 12 and 14, to extend outwardly a distance from the exterior sides 22 and 24. More preferably, each of the looped portions 30 and 32 has an enlarged head 40 and 42 formed by the open loop and a collapsed or flattened double-walled portion 44 and 46, for reasons which will become apparent.

Each of the leg portions 34 and 36 extends a distance inwardly from the interior sides 18 and 20, respectively, and each is shaped to form a seal body receiving space 48 and 49, respectively. Preferably, each of the leg portions 34 and 36 is bent to form a first angled portion 50 and 52 and a second straight portion 54 and 56. More preferably, the angled portions 50 and 52 are bent back toward the panels 12 and 14 at an acute angle relative to the panels 12 and 14. The straight portions 54 and 56 preferably extend inwardly from the angled portions 50 and 52 generally perpendicular to the panels 12 and 14.

Now it will be appreciated that when the joint edges 26 and 28 of adjacent panels 12 and 14 are positioned to abut each other, the seal flange receiving spaces 38 and 39 of the looped portions 26 and 28 together form a seal flange channel 64, which is closed at the exterior end 66 by the enlarged heads 40 and 42 and open at the interior end 68. Now it will also be apparent that the seal body receiving spaces 48 and 49 of the adjacent and oppositely configured leg portions 34 and 36 diverge to form a generally V-shaped seal body channel 71 that diverges toward the interior sides 18 and 20 of the panels 12 and 14.

With continued reference to FIG. 1, the preferred seal will be described. As shown, the seal 16 is generally Y-shaped (inverted in the drawings) having a longitudinal flange 72 extending from a broader body 73. The outer diameter of the body 73 gradually increases from the end 74 integral with the flange 72 towards the broader free end 76. Now it will be understood that the seal flange channel 64 and the seal body channel 71 formed by the abutting joint edges 26 and 28 of adjacent wall panels 12 and 14 are shaped to conform to the seal. More particularly, it will now be apparent that the broader body 73 of the seal is seated in the seal body channel 71 so that positive pressure on the interior side of the wall panels 12 and 14 will urge the body portion into appressing engagement with the seal body channel. Thus, positive air pressure inside the enclosure formed by the panels 12 and 14 will enhance the function of the seal 16 in the joint, rather than compromise the integrity of the joint.

It will now also be readily apparent that the enlarged heads 40 and 42 formed by the open looped portions 30 and 32 provide abutting faces which meet each other to enclose the end 78 of the seal flange 72. This protects the seal 16 from exposure to the elements and prolongs its life.

The abutting joint edges 26 and 28 should be connected to each other. For this purpose, many devices may be employed. In the embodiment shown, a machine screw 80 and lock nuts 82 and 84 are used. The screw 80 is inserted through holes (not shown) provided in the flattened double walled portions 44 and 46 of the looped portions 30 and 32. In this way, the screw 80 pierces the flange 72 of the seal 16 only, and not the body 73. Thus, the screws 80 do not compromise the airtight seal between the seal 16 and the wall panels 12 and 14. Moreover, it will be seen that the screws 80 that connect the panels 12 and 14 are accessible from the exterior of the structure or enclosure. This simplifies maintenance and repair. While a machine screw is used in the embodiment shown, other connecting devices, such as welds, brads, adhesives, crimping, rivets, clamps, and the like may be substituted depending on the particular circumstances.

Referring still to FIG. 1, it may be advantageous to include interior liner panels 86 and 88 for containing insulation 90. To this end, the straight portions 54 and 56 of the leg portions 34 and 36 provide convenient liner attachment members. Preferably, the liner panels 86 and 88 comprise liner brackets 92 and 94. These liner brackets may be attached to the straight portions 54 and 56, preferably with strip seals 96 and 98 in between. The liner brackets 92 and 94 are connected to the straight portions 54 and 56 by means of screws 100 and 102 with lock nuts 104 and 106, or other suitable connecting devices as mentioned previously. It will be appreciated that this means of attaching the liner panels provides an economical thermal barrier as well as further enhancing the energy efficiency of the structure. The likelihood of external condensation on the walls of the enclosure also is reduced or eliminated.

Figure 2:
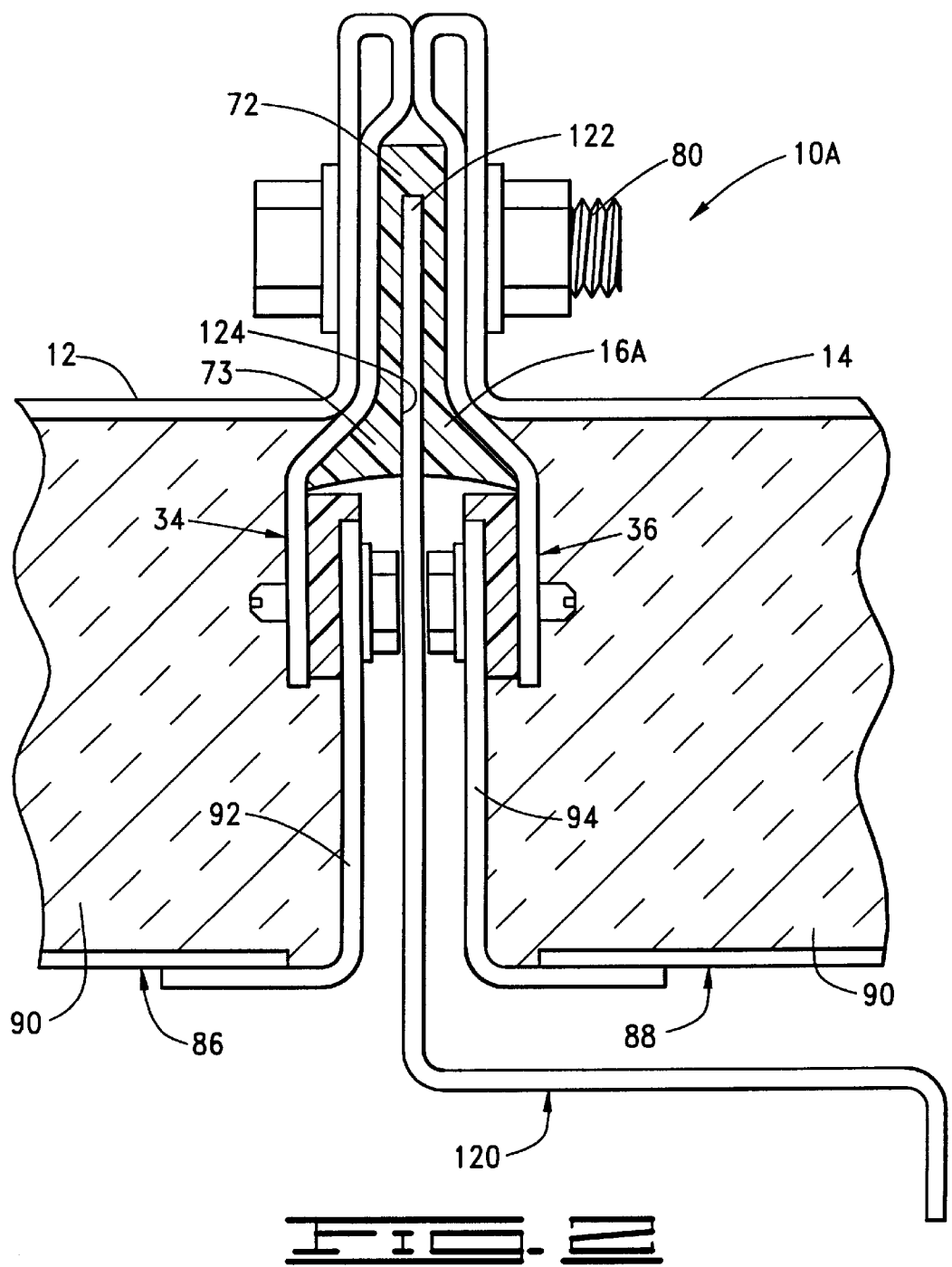
FIG. 2 shows a plan view of a second embodiment of the panel assembly of this invention, which comprises a divider panel.

Turning now to FIG. 2, there is shown therein a second embodiment of the present invention. In this embodiment, the wall panel assembly 10A is similar to the assembly 10 shown in FIG. 1 and generally comprises first and second wall panels 12 and 14, liner panels 86 and 88, and insulation 90.

This embodiment differs in that it includes a divider panel 120. Although it may have various configurations, in the embodiment shown the divider panel 120 comprises a joint edge 122 configured to fit between the leg portions 34 and 36 and the liner brackets 92 and 94 and to be insertable a distance into the seal 16A. The seal 16A is shaped externally similar to the seal 16 in FIG. 1. However, to accommodate the joint edge 122 of the divider panel 120, the seal 16A is provided with a slit 124 sized to receive the joint edge 122 and which extends through the body portion 73 and preferably a distance into the flange 72. The joint edge 122 preferably will be formed with holes (not shown) to receive the machine screw 80. Formed thusly, the position of the joint edge 122 of the divider panel 120 is fixed by the same connecting device as the joint between the wall panels 12 and 14.

The panels and seals of the present invention may be formed of various known materials and using any one of several production techniques. For example, the wall panels may be formed of sheet metal by the roll forming process. The seal, though its configuration is unique, can be extruded using conventional methods.

Now it will be appreciated that the wall panel assembly of the present invention provides an advantageous design for connecting numerous panels to form an enclosure. Although other applications will be apparent, the present invention is particularly suitable for use in constructing air handler cabinets. Because of the way the Y-shaped seal is seated in the channel formed by the abutting edges of the wall panels, the integrity of the joints is actually enhanced by the increased internal air pressure inside these enclosures. The construction and maintenance of these air handling cabinets is simplified because the joints can be assembled and disassembled from the outside. Even the addition of liner panels and divider panels is facilitated by the design of this wall panel joint.

Changes can be made in the combination and arrangement of the various parts and elements described herein without departing from the spirit and scope of the invention as defined in the following claims.

What is claimed is:

1. A jointed wall panel assembly comprising:

first and second wall panels, each having an interior side and exterior side and each having at least one joint edge; and a seal being generally Y-shaped in cross-section, having a longitudinal flange extending from a broader body portion having an outer diameter which gradually decreases to meet the base of the flange;

means for connecting the joint edges;

wherein each joint edge of the first and second panels is folded back upon itself to form a looped portion on the exterior side of the panels extending a distance outwardly from the exterior side, and a leg portion on the interior side of the panels extending a distance inwardly from the interior side, wherein the looped portion is formed to provide a seal flange receiving space, and wherein the leg portion is formed to provide a seal body receiving portion, so that when the joint edges of the first and second panel are positioned adjacent each other the flange receiving spaces form a flange channel and the adjacent body receiving spaces form a seal body channel, the seal body channel being generally V-shaped diverging toward the interior sides of the panels, so that when the seal is positioned between immediately adjacent joint edges the flange is positioned in the flange channel and the body portion is positioned in the body channel, whereby positive pressure on the interior side of the panels will urge the body portion of the seal into appressing engagement with the body channel.

2. The panel assembly of claim 1 wherein each of the leg portions of the joint edges has a liner attachment portion extending inwardly from the body receiving portion of the leg, wherein the panel assembly further comprises a pair of liner panels attachable to the liner attachment portions, and means for attaching the liner panels thereto.

3. The panel assembly of claim 2 wherein the panel assembly further comprises a pair of strip seals for sealing the connection between the liner panels and the liner attachment portions of the joint edge.

4. The panel assembly of claim 2 wherein panel assembly further comprises insulation receivable between the wall panels and the liner panels.

5. The panel assembly of claim 1 wherein the looped portions of the joint edges are formed with an enlarged heads having abutting faces so that when the panel assembly is assembled the flange portion of the seal is enclosed by the looped portions.

6. The panel assembly of claim 1 wherein the seal is provided with a longitudinal slit, and wherein the panel assembly further comprises a divider panel having a joint edge receivable in the slit in the seal.

7. A wall panel for use in forming an enclosure with other similar wall panels and Y-shaped seals having a flange portion and a broader body portion, wherein the wall panel has an exterior side and interior side and a joint edge, wherein the joint edge is folded back upon itself to form a looped portion on the exterior side of the panel extending a distance outwardly from the exterior side, and a leg portion on the interior side of the panel extending a distance inwardly from the interior side, wherein the looped portion is formed to provide a seal flange receiving space, and wherein the leg portion is formed to provide a seal body receiving portion, so that when the joint edge of the wall panel is positioned adjacent the joint edge of a similar wall panel the flange receiving spaces form a seal flange channel and the adjacent seal body receiving spaces form a seal body channel, the seal body channel being generally V-shaped diverging toward the interior sides of the panels, so that when a Y-shaped seal is positioned between immediately adjacent joint edges the flange is positioned in the flange channel and the body portion is positioned in the base channel whereby positive pressure on the interior side of the panels will urge the body portion of the seal into appressing engagement with the body channel.

8. The wall panel of claim 7 wherein the leg portion of the joint edge has a liner attachment portion extending inwardly from the seal body receiving portion.

9. The wall panel of claim 7 wherein the looped portion of the joint edge is formed with an enlarged head with an abutment face formed to abut the abutment face of an adjacent, similarly formed wall panel, so that when the wall panel is assembled with an adjacent wall panel the flange portion of a Y-shaped seal is enclosed by the looped portions.

* * * * *